(12) United States Patent
Massard

(10) Patent No.: US 10,197,786 B1
(45) Date of Patent: Feb. 5, 2019

(54) METHODS AND APPARATUSES FOR FABRICATING ELECTROWETTING DISPLAYS

(71) Applicant: Amazon Technologies, Inc., Seattle, WA (US)

(72) Inventor: Romaric Mathieu Massard, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 371 days.

(21) Appl. No.: 14/856,809

(22) Filed: Sep. 17, 2015

(51) Int. Cl.
*G02B 26/00* (2006.01)
*B05D 1/00* (2006.01)
*B05B 1/00* (2006.01)
*B05D 1/26* (2006.01)
*B05B 1/14* (2006.01)

(52) U.S. Cl.
CPC ............. *G02B 26/005* (2013.01); *B05B 1/14* (2013.01); *B05D 1/26* (2013.01); *G02B 26/004* (2013.01); *Y10T 156/10* (2015.01); *Y10T 156/1702* (2015.01); *Y10T 156/179* (2015.01)

(58) Field of Classification Search
CPC .................................................. G02B 26/004
See application file for complete search history.

(56) References Cited

U.S. PATENT DOCUMENTS

| 9,581,804 | B1* | 2/2017 | Leguijt | G02B 26/005 |
| 9,625,704 | B1* | 4/2017 | Slack | G02B 26/005 |
| 2013/0048197 | A1* | 2/2013 | Schram | G02B 26/004 |
| | | | | 156/146 |

* cited by examiner

*Primary Examiner* — Linda L Gray
(74) *Attorney, Agent, or Firm* — EIP US LLP

(57) ABSTRACT

An apparatus for fabricating one or more electrowetting display devices, wherein the apparatus comprises a fluid dispenser to dispense fluids onto a substrate. The fluid dispenser comprises a first nozzle to dispense a first fluid of the fluids onto the substrate. The fluid dispenser further comprises two or more additional nozzles. Each additional nozzle dispenses a fluid in communication with the first fluid. The fluids dispensed by the additional nozzles combine to form a single second fluid that is substantially immiscible with the first fluid.

13 Claims, 5 Drawing Sheets

METHODS AND APPARATUSES FOR FABRICATING ELECTROWETTING DISPLAYS

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display can affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

Electronic displays, such as electrowetting displays, include an array of pixels individually bordered by pixel walls that retain a fluid such as opaque oil, for example. Light transmission through each pixel is adjustable by electronically controlling a position of the fluid in the pixel. A process of fabricating an electrowetting display includes a number of steps, a number of which can involve improvements that result in faster manufacturing times and higher yields.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
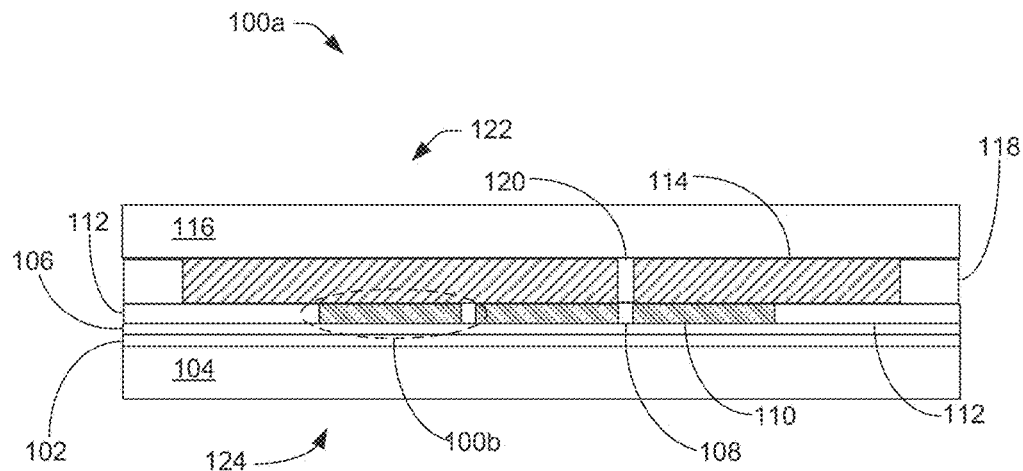
FIG. 1 illustrates a cross-section of a portion of an electrowetting display device, according to some embodiments.

In various embodiments described herein, electronic devices include displays for presenting content. In some examples, the electronic devices may include one or more components associated with the display, such as a touch sensor component layered atop the display for detecting touch inputs, a front light or back light component for lighting the display, and/or a cover layer component, which may include antiglare properties, antireflective properties, anti-fingerprint properties, anti-cracking properties, and the like. Various embodiments described herein also include techniques for assembling electronic devices including these components for the displays and other features described herein.

Embodiments describe apparatuses and techniques for fabricating electrowetting displays. For example, in a batch fabrication environment, a number of electrowetting display devices comprising arrays of display elements (e.g., pixels or subpixels) may be formed on a first substrate, which may be transparent. A fluid dispenser dispenses a first fluid (e.g., an opaque oil) and a second fluid (e.g., what may be considered to be an electrolyte solution) onto the first substrate that includes the display elements. The fluid dispenser dispenses the second fluid so as to cover the dispensed first fluid and the individual display elements separated by walls. Such a fluid dispenser generally includes a first "slit" (nozzle) to dispense the first fluid and a second slit (nozzle) to dispense the second fluid. Such a fluid dispenser is generally called a "double-slit" fluid dispenser.

In accordance with embodiments, the fluid dispenser comprises a "multi-slit" fluid dispenser and includes more than two slits (e.g. one or more nozzles may be used for various fluids). In embodiments, the fluid dispenser includes a first nozzle configured to dispense the first fluid. The fluid dispenser further includes a second nozzle adjacent to the first nozzle. In embodiments, the second nozzle is configured to dispense water. A third nozzle is adjacent to the second nozzle while a fourth nozzle is adjacent to the third nozzle. The third and fourth nozzles are configured to dispense components of the second fluid. In an embodiment, the second fluid comprises an electrolyte solution (e.g., a solution that includes an electrolyte). The electrolyte solution may comprise, among a number of other possibilities, including: a polyether; a peroxide; a polyol such as a diol, a triol and/or a tetraol; an ether; dioxalane; dimethoxymethane; an amide; a polyamide; a carboxylic acid; formic acid; acetic acid; propanoic acid; glycolic acid; a heteroatom substituted carboxylic acid; a halogenated carboxylic acid; chloroacetic acid; trifluoroacetic acid; a dicarboxylic acid; oxalic acid; malonic acid; succinic acid; and/or glutaric acid; a tricarboxylic acid; citric acid; aconitic acid; an ester; methyl acetate; ethyl lactate; a sulphone; dimethyl sulphate; dimethyl sulphite; methylsulphonylmethane; an aldehyde; acetaldehyde; glyoxal; methylglyoxal; a peroxide; methyl ethyl ketone peroxide; oxamic acid; organosulphoxide; ethylene carbonate; propylene carbonate; diethylene glycol; ethylene glycol; polyethylene glycol; propylene glycol; dipropylene glycol; erythritol; glycerol; butanetriol; derivatives thereof; or combinations thereof. Accordingly, in such an embodiment, the third nozzle dispenses dipropylene glycol and the fourth nozzle dispenses propylene glycol. Alternatively, the second fluid may comprise a salt solution such as a solution of potassium chloride in water and thus, the third and fourth nozzles may dispense components for such a solution.

During operation, the fluid dispenser moves relative to the first substrate and dispenses fluids provided to the nozzles. The fluids are dispensed from the nozzles onto the first substrate. Initially, the first substrate will be in contact with the first fluid (e.g., an opaque oil) from the first nozzle of the dispenser. Water dispensed from the second nozzle helps remove the first fluid from the top surfaces of the walls because of the low viscosity of the water and high surface tension of the walls. The third nozzle dispenses the dipropylene glycol and due to the dipropylene glycol's very high viscosity, the dipropylene glycol will push away the flow of water to help prevent or minimize water remaining in the finished electrowetting display device. Thus, substantially all of the water is removed such that substantially only small hygroscopic amounts of water remain, which are inevitable from the atmosphere. Due to the viscosity of the dipropylene glycol, a thick film of dipropylene glycol remains on top of the first fluid on the first substrate. Finally, propylene glycol is dispensed from the fourth nozzle onto the dipropylene glycol. Once the electrowetting display device is closed, the propylene glycol and dipropylene glycol layers will mix to provide a single fluid in the form of the second fluid on the first fluid within desired specifications. For example, a ratio of dipropylene glycol to propylene glycol may be approximately 80-60% dipropylene glycol to 20-40% propylene glycol. Generally, by dispensing the first and second fluids in this manner, the speed of the fabrication process may be increased. For example, the fluid dispenser may be able to move at a rate in a range of 1 to 10 millimeters (mm)/second(s).

A second substrate, which may be transparent, is moved onto the first substrate that includes the display elements and the dispensed first and second fluids in order to close the electrowetting display device. In particular, the fluid dispenser may include a connection portion to which the second substrate is attached. Accordingly, as the fluid dispenser is moved across and over the first substrate that includes the display elements, the second substrate is concomitantly moved or dragged across and over the first substrate and the display elements, being substantially supported by the second fluid. Herein, though motions of a fluid dispenser, a first substrate and a second substrate are described as the first substrate being stationary while the fluid dispenser and the second substrate are moving, the opposite may be the case. Additionally, the fluid dispenser and the second substrate may be moving in one direction while the first substrate may be moving in an opposite direction. In other words, motions among the fluid dispenser, the second substrate and the first substrate are relative, and claimed subject matter is not limited in this respect.

An electrowetting display device can be a transmissive, reflective, or transflective display that generally includes an array of display elements in the form of electrowetting elements (e.g., pixels or subpixels) configured to be operated by an active matrix addressing scheme. For example, rows and columns of electrowetting elements are operated by controlling voltage levels on a plurality of source lines and gate lines. In this fashion, the electrowetting display device can produce an image by selecting particular electrowetting elements to transmit, reflect or block light. Electrowetting elements are addressed (e.g., selected) via rows and columns of the source lines and gate lines that are electrically connected to transistors (e.g., used as switches) included in each electrowetting element. Transistors take up a relatively small fraction of the area of each electrowetting element to allow light to efficiently pass through (or reflect from) the electrowetting element. Herein, an electrowetting element may, unless otherwise specified, comprise a pixel or subpixel of an electrowetting display device. Such a pixel or subpixel may be the smallest light transmissive element of a display that is individually operable to directly control an amount of light transmission or reflection through the element. For example, in some implementations, an electrowetting element may be a pixel that includes a red subpixel, a green subpixel, a blue subpixel and a white subpixel for a red-green-blue-white (RGBW) display. In other implementations, a display element may be a pixel that is a smallest component, e.g., the pixel does not include any subpixels.

Electrowetting displays include an array of electrowetting elements comprising pixels and/or subpixels located between two support plates, such as the first substrate and the second substrate. For example, the first substrate may be a bottom support plate that, in cooperation with the second substrate (which may be a top support plate), contains electrowetting elements that include at least one electrode, electrowetting oil, a fluid that includes an electrolyte (i.e. the electrolyte solution) and pixel walls between the support plates. Support plates may include glass, plastic (e.g., a transparent thermoplastic such as PMMA or other acrylic), or other material and may be made of a rigid or flexible material, for example. In addition to electrowetting elements, spacers and edge seals can also be located between the support plates. Hereinafter, example embodiments are described as including clear substrates or support plates that comprise glass support plates. However, support plates can comprise any of a number of transparent amorphous materials, such as plastic, glass, quartz, semiconductors, and so on, and claimed subject matter is not limited in this respect. Herein, describing an element or material as being "transparent" means that the element or material can transmit a relatively large fraction of the light incident upon it. For example, a transparent substrate or layer may transmit more than 70% or 80% of the light impinging on its surface, though claimed subject matter is not limited in this respect.

Individual electrowetting elements, e.g., pixels, are surrounded by pixel walls made, for instance, from photoresist material. In embodiments, the pixel walls are disposed on the bottom support plate. Pixel walls retain at least the first fluid that is electrically non-conductive, such as opaque or colored oil, in the individual pixels. A cavity formed between the support plates is filled, as previously discussed, with the first fluid (e.g., retained by pixel walls) and the second fluid (e.g., the electrolyte solution) that is electrically conductive or polar. The second fluid may be transparent, but may be colored or light absorbing. The second fluid is substantially immiscible with the first fluid so that the first fluid and the second fluid do not substantially mix with each other, and in some examples do not mix with each other to any degree. Herein, substances are immiscible with one another if the substances do not substantially form a solution.

Spacers and edge seals which mechanically connect the bottom support plate with the overlying top support plate, or which form a separation between the bottom support plate and the top support plate, contribute to mechanical strength of the electrowetting display device. Edge seals, for example, being disposed along a periphery of an array of electrowetting elements, may contribute to retaining (e.g., first and second) fluids between the bottom support plate and the overlying top support plate. In embodiments, the spacers may be transparent. Transparency of spacers can at least partially depend on the refractive index of the spacer material, which should be similar to or the same as the refractive indices of surrounding media. Spacers are also desirably chemically inert to surrounding media.

In various embodiments, an electrowetting element of an electrowetting display device includes, among other things, an electrode layer and a thin film transistor (TFT) that is switched to either select or deselect the electrowetting element using active matrix addressing. A TFT is a particular type of field-effect transistor that includes thin films of an active semiconductor layer as well as a dielectric layer and metallic contacts over a supporting (but non-conducting) substrate, which may be glass or any of a number of other materials, for example.

In some embodiments, TFTs are fabricated onto a glass (or other) substrate or the bottom plate of the electrowetting display device. For example, TFTs may be disposed on a top surface of the glass substrate on the same side of the substrate as the electrowetting elements. Generally, there are various layers between the TFTs and the first fluid.

In some embodiments, an electrowetting display device as described herein can comprise a portion of a system that includes one or more processors and one or more computer memories, which may reside on a control board, for example. Display software can be stored on the one or more memories and can be operable with the one or more processors to modulate light that is received from an outside source (e.g., ambient room light) or out-coupled from a light guide of the display device. For example, display software can include code executable by a processor to modulate optical properties of individual pixels of the electrowetting display device based, at least in part, on electronic signals representative of image or video data. The code can cause the processor to modulate the optical properties of pixels by controlling electrical signals (e.g., voltages, currents, fields, and so on) on, over, or in layers of the electrowetting display device.

FIG. 1 is a cross-section of a portion of an electrowetting display device 100a illustrating several electrowetting elements 100b, according to some embodiments. Each electrowetting element 100b represents a pixel or a subpixel. An electrode layer 102 is formed on a bottom plate 104 (e.g., a glass substrate). Electrode layer 102 is generally a layer containing individual pixel electrodes per pixels (electrowetting elements 100b) separated from each other by insulating material. In some implementations, an optional dielectric barrier layer (not illustrated) may at least partially separate electrode layer 102 from a hydrophobic layer 106 also formed on bottom plate 104. In some implementations, hydrophobic layer 106 can comprise a fluoropolymer, such as AF1600®, produced by DuPont, based in Wilmington, Del. Hydrophobic layer 106 can also be any of a number of water-repelling materials that affect wettability of an adjacent material, for example. In embodiments, hydrophobic layer 106 is a coating on an included dielectric layer (not illustrated).

Pixel walls 108 form a patterned electrowetting element grid on hydrophobic layer 106. Pixel walls 108 may comprise a photoresist material, such as epoxy-based negative photoresist SU-8, for example. In an embodiment, pixel walls 108 are black or dark in order to prevent or minimize the passage of light therethrough. In other embodiments, pixel walls 108 may be transparent. The patterned electrowetting element grid comprises rows and columns that form an array of electrowetting elements 100b. For example, an electrowetting element 100b can have a width and length in a range of about 50 to 500 microns. A first fluid 110, which can have a thickness (e.g., depth) in a range of about 1 to 10 microns, for example, overlies hydrophobic layer 106. First fluid 110 is partitioned by pixel walls 108 of the patterned electrowetting element grid. An outer rim 112 can comprise the same material as pixel walls 108. A second fluid 114, such as an electrolyte solution, overlies first fluid 110 and pixel walls 108 of the patterned electrowetting element grid.

A top plate 116 covers second fluid 114 and edge seals 118 retain second fluid 114 over the electrowetting element array. Top plate 116 may be supported by edge seals 118 and spacers 120 that are interspersed throughout the array of display elements 100. For example, some or all spacers 120 may be located over at least a portion of the regions where pixel walls 108 intersect, though claimed subject matter is not limited in this respect. In embodiments, spacers 120 may be substantially aligned with pixel walls 108. In embodiments, pixel walls 108 and spacers 120 may be in contact after processing to create electrowetting display device 100a. A voltage V applied across, among other things, second fluid 114 and electrode 102 of individual electrowetting elements 100b can control transmittance or reflectance of the individual electrowetting elements 100b.

The electrowetting display device 100a has a viewing side 122 on which an image formed by the electrowetting display device 100a can be viewed, and a rear side 124. Top plate 116 faces viewing side 122 and bottom plate 104 faces rear side 124. In an alternative embodiment, the electrowetting display device 100a may be viewed from rear side 124.

The electrowetting display device 100a may be a reflective, transmissive or transflective type. The electrowetting display device 100a may be a segmented display type in which the image is built up of segments. The segments can be switched simultaneously or separately. Each segment includes one electrowetting element 100b or a number of electrowetting elements 100b that may be neighboring or distant from one another. Electrowetting elements 100b included in one segment are switched simultaneously, for example. The electrowetting display device 100a may also be an active matrix driven display type or a passive matrix driven display type, just to name a few examples.

Second fluid 114 is substantially immiscible with first fluid 110. As previously noted, second fluid 114 may be an electrolyte solution. An electrolyte solution can be electrically conductive or polar, and may be water or a salt solution such as a solution of potassium chloride in a mixture of water and ethyl alcohol, for example. In an embodiment, second fluid 114 comprises an electrolyte solution comprising dipropylene glycol and propylene glycol. Second fluid 114 is preferably transparent, but may be colored, reflecting or light absorbing. First fluid 110 is electrically non-conductive and may for instance be an alkane like hexadecane or (silicone) oil. Hydrophobic layer 106 is arranged on bottom plate 104 to create an electrowetting surface area. The hydrophobic character causes first fluid 110 to adhere preferentially to hydrophobic surface 106 since first fluid 110 has a higher wettability with respect to the surface of hydrophobic layer 106 than second fluid 114. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

First fluid 110 absorbs at least a part of the optical spectrum. First fluid 110 may be transmissive for a part of the optical spectrum, forming a color filter. For this purpose, first fluid 110 may be colored by addition of pigment particles or dye, for example. Alternatively, first fluid 110 may be black (e.g., absorbing substantially all parts of the optical spectrum) or reflecting. Hydrophobic layer 106 may be transparent or reflective. In embodiments, hydrophobic layer 106 is transparent and an included dielectric barrier layer (not illustrated) under hydrophobic layer 106 is reflective. A reflective layer may reflect the entire visible spectrum, making the layer appear white, or part of it, making it have a color.

When a voltage is applied across electrowetting element 100b, electrowetting element 100b will enter into an active state. Electrostatic forces will impart motion to the second fluid 114 toward electrode layer 102, thereby displacing first fluid 110 from the area of hydrophobic layer 106 to pixel walls 108 surrounding the area of hydrophobic layer 106, to a droplet-like form. This action uncovers first fluid 110 from a part of the surface of hydrophobic layer 106 of electrowetting element 100b. When the voltage across electrowetting element 100b is returned to an in-active signal level of zero or a value near to zero, electrowetting element 100b will return to an inactive state, where first fluid 110 flows back to cover the surface of hydrophobic layer 106. In this way, first fluid 110 forms an electrically controllable optical switch in each electrowetting element 100b. Of course, such details of an electrowetting display device are merely examples, and claimed subject matter is not limited in this respect.

Figure 2:
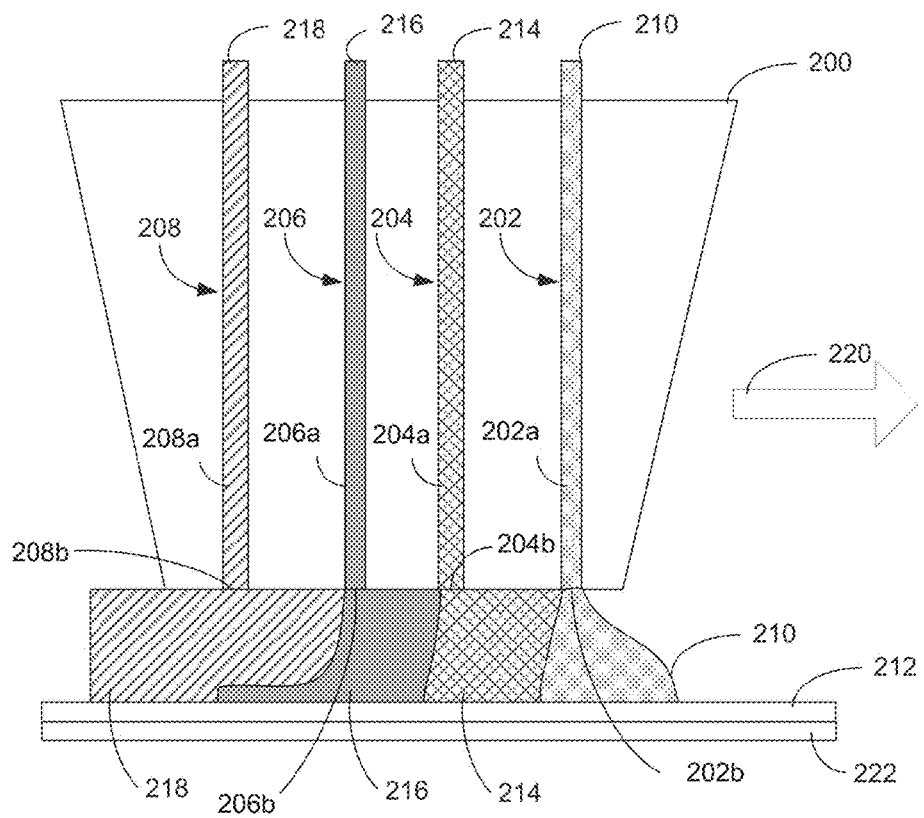
FIG. 2 illustrates a side view of a fluid dispenser, according to some embodiments.

FIG. 2 illustrates an exaggerated (i.e. not to scale) side view of a fluid dispenser 200, according to some embodiments, for dispensing multiple fluids for fabricating an electrowetting display device 100a. Fluid dispenser 200 generally includes four nozzles 202, 204, 206 and 208 that may be considered individual fluid dispensers. In embodiments, the nozzles 202, 204, 206 and 208 have a diameter in a range 10 to 500 microns. More particularly, in embodiments, the nozzles 202, 204, 206 and 208 have a diameter less than 1 mm. In general, the diameter of the nozzles 202, 204, 206 and 208 depends upon the fluid properties of the fluids to be dispensed.

Fluid dispenser 200 is configured to dispense a first fluid 210 (e.g., an opaque oil) via first nozzle 202 onto a substrate 212 (e.g., bottom plate 104) that includes one or more arrays of electrowetting elements, e.g., electrowetting elements 100b shown in FIG. 1 (not illustrated in FIG. 2). For example, a portion of such a substrate may be the same or similar to bottom plate 104 illustrated in FIG. 1. In some implementations, first fluid 210 may be the same as or similar to first fluid 110 shown in FIG. 1. Second nozzle 204 is configured to dispense a second fluid 214 onto the first fluid 210 on substrate 212. In an embodiment, second fluid 214 comprises water. Third and fourth nozzles 206, 208 are configured to dispense fluids 216, 218, respectively, that are components of a single fluid and combine to form the single fluid, which is substantially immiscible with first fluid 210. The resulting single fluid may be the same as or similar to second fluid 114 in FIG. 1. In an embodiment, third fluid 216 comprises dipropylene glycol and fourth fluid 218 comprises propylene glycol to form an electrolyte solution comprising the two fluids 216 and 218.

In some implementations, fluids 210, 214, 216, and 218 may be transiently contained in reservoirs (not illustrated) located within fluid dispenser 200. Alternatively, fluids 210, 214, 216, and 218 may be directly supplied from an external source (not illustrated) to first nozzle 202, second nozzle 204, third nozzle 206, and fourth nozzle 208, respectively. First nozzle 202 comprises a channel 202a defined within fluid dispenser 200 through which first fluid 210 travels and an opening 202b through which first fluid 210 exits. Second nozzle 204 comprises a channel 204a defined within fluid dispenser 200 through which second fluid 214 travels and an opening 204b through which second fluid 214 exits. Third nozzle 206 comprises a channel 206a defined within fluid dispenser 200 through which third fluid 216 travels and an opening 206b through which third fluid 216 exits. Fourth nozzle 208 comprises a channel 208a defined within fluid dispenser 200 through which fourth fluid 218 travels and an opening 208b through which fourth fluid 214 exits.

In embodiments, one or more of fluids 210, 214, 216, and 218 may be dispensed from individual, discrete dispensers (not illustrated). Such discrete dispensers are separated such that an air gap is not created between the fluids as the fluids are dispensed. Motion of the discrete dispensers is relative to substrate 212 during dispensing of the fluids, i.e. the dispensers may move, substrate 212 may move or both the dispensers and substrate 212 may move.

During a fabrication process for placing the fluids in an array of electrowetting elements formed on a substrate, fluid dispenser 200 moves in a direction 220 relative to the underlying substrate 212, which may be supported by a platform 222. Motion of fluid dispenser 200 is relative to platform 222. In other words, during fabrication fluid dispenser 200 moves in direction 220 relative to platform 222 or platform 222 moves opposite to direction 220 relative to fluid dispenser 200. Fluid dispenser 200 dispenses the fluids 210, 214, 216 and 218 onto the substrate 212.

More particularly, initially, substrate 212 will be in contact with first fluid 210 (e.g., an opaque oil) from first nozzle 202 into electrowetting elements (not illustrated in FIG. 2). Second fluid (e.g., water) dispensed from second nozzle 204 helps remove first fluid 210 from top surfaces of electrowetting element walls (e.g., pixel walls 108) (not illustrated in FIG. 2) due to the generally low viscosity of water and high surface tension of the electrowetting element walls (generally in a range of 68 to 74 milli-Newtons (mN) per meter (m), which may be raised to approximately 78 to 80 mN/m if the water is doped with salt), which, as previously mentioned, may comprise a photoresist material. More particularly, water may be used as the second fluid dispensed to remove the oil due to oil agglomeration at the top surfaces of the electrowetting element walls, which is due to ultra-violet (UV) exposure of the walls that makes the affinity of the walls for electrolyte lower than for oil. Third nozzle 206 dispenses third fluid 216, e.g., dipropylene glycol, and due to dipropylene glycol's very high viscosity (generally in a range of 70-80 milli-pascal (mPA) second) relative to the viscosity of water, the dipropylene glycol will push away the water off first fluid 210 towards fluid dispenser 200 (i.e. in direction 220) to help prevent or minimize water remaining in a finished electrowetting display device. The water will thus be pushed towards an edge of substrate 212 in direction 220 and off substrate 212 when fluid dispenser 200 reaches that edge. Thus, substantially all of the water is removed such that substantially only small hygroscopic amounts of water remain, which are inevitable from the atmosphere. Fluids other than water may be used as long as such fluids have a lower viscosity relative to the dipropylene glycol.

Due to the viscosity of the dipropylene glycol, a thick film of dipropylene glycol remains on top of first fluid 210 on substrate 212. Finally, fourth fluid 218, e.g., propylene glycol, is dispensed from fourth nozzle 218 onto the dipropylene glycol. Once the electrowetting display device 100a is closed, e.g., top plate 116 is placed over bottom plate 104, the propylene glycol and dipropylene glycol layers will mix to provide second fluid 114, on first fluid 110 within desired specifications. Generally, by dispensing first and second fluids 110, 114 in this manner, fluids can be created, e.g., second fluid 114, within the electrowetting display devices during dispensing of the fluids during the fabrication process, which increase the speed of the fabrication process.

While fluid dispenser 200 has been described as including four nozzles, more or fewer nozzles may be included depending upon the application. For example, only three nozzles may be included if water is not needed or desired for dispensing. Additionally, second fluid 114 may be made up of more than two components and thus, more than two nozzles may be needed to dispense the components for second fluid 114, i.e. two components may only make up a portion of second fluid 114. Also, first fluid 110 may be made up of multiple components and thus, more than one nozzle may be needed to dispense the multiple components. There may also be more fluids than just first fluid 110 and second fluid 114 and thus, fluid dispenser 200 may include additional nozzles.

Figure 3:
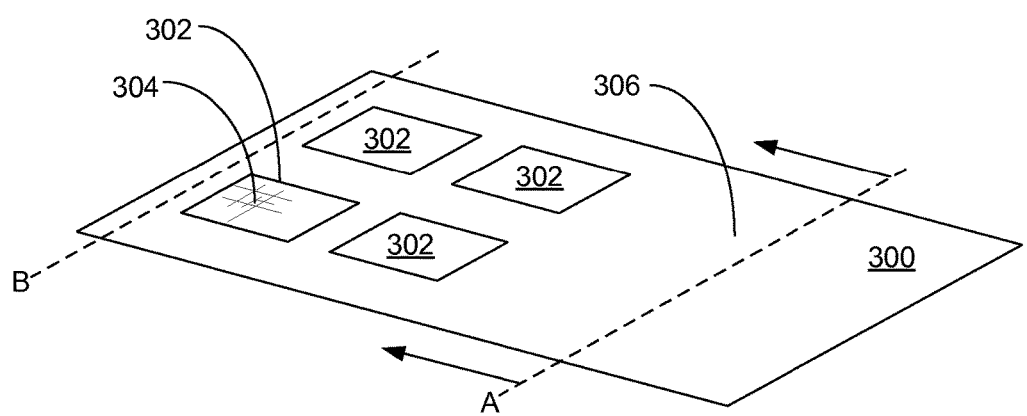
FIG. 3 illustrates a perspective view of a substrate with electrowetting element arrays formed thereon, according to some embodiments.

FIG. 3 illustrates a perspective view of a substrate 300 with arrays of electrowetting elements 302 formed thereon, according to some embodiments. Arrays of electrowetting elements 302 may be configured to be in rows and columns. Although four arrays of electrowetting elements 302 are illustrated in FIG. 3, and later in FIGS. 4 and 5, (e.g., four being batch-processed together), any number is possible. For example, the four arrays of electrowetting elements 302 will later be cut into individual portions so as to become four electrowetting display devices (e.g., electrowetting display device 100a). These four individual portions will include portions of substrate 300, first and second fluids (e.g., first and second fluids 110 and 114), and portions of a top plate (e.g., top plate 116) overlying each of the four arrays of electrowetting elements 302. Accordingly, portions of substrate 300 underlying individual arrays of electrowetting elements 302 will later become a permanent part of the electrowetting display devices (e.g., as a bottom plate such as bottom plate 104 illustrated in FIG. 1). Arrays of electrowetting elements 302 include a relatively large number (e.g., thousands or millions) of individual electrowetting elements 304 (e.g., pixels or subpixels), which may be the same as or similar to electrowetting elements 100b. For example, individual electrowetting elements 304 may be the same as or similar to electrowetting elements 100b illustrated in FIG. 1.

A fluid dispenser, such as fluid dispenser 200 illustrated in FIG. 2, for example, may be placed over substrate 300 anywhere between positions "A" and "B", indicated in FIG. 3. Such a fluid dispenser is configured to dispense multiple fluids onto substrate 300 and display element arrays 302. In particular, the fluid dispenser dispenses first, second, third and fourth fluids, as described with respect to FIG. 2, as the fluid dispenser moves over substrate 300 (and display element arrays 302). In detail, the fluid dispenser dispenses a fluid followed relatively quickly by dispensing a subsequent fluid on the substrate 300.

Figure 4:
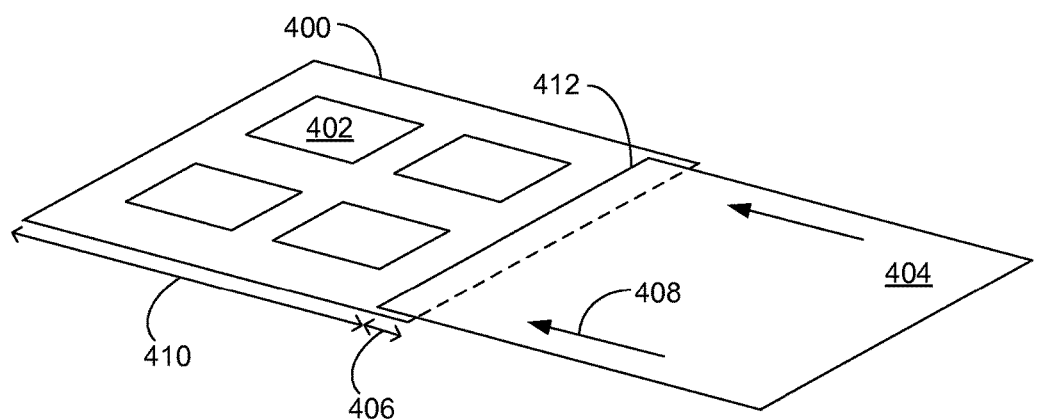
FIGS. 4 and 5 illustrate perspective views of a bottom plate with electrowetting element arrays formed thereon and a top plate covering at least a portion of the bottom plate, according to some embodiments.

FIG. 4 illustrates a perspective view of a bottom plate 400, e.g., bottom plate 104, with arrays of electrowetting elements 402 formed thereon and a top plate 404 covering at least a portion 406 of the bottom plate 400, according to some embodiments for fabricating an electrowetting display device, e.g., electrowetting display device 100a. As depicted in FIG. 4 by arrows 408, top plate 404 is moved onto and over bottom plate 400 and arrays of electrowetting elements 402. In detail, though not illustrated in FIG. 4, a fluid dispenser, e.g., fluid dispenser 200 is used to dispense multiple fluids onto bottom plate 400, as previously described. As the fluid dispenser is moved over bottom plate 400 to dispense the fluids onto the bottom plate, top plate 404 is moved over bottom plate 400. A portion 410 of bottom plate 400 not yet covered by top plate 404 is first covered with the fluids by the fluid dispenser near (e.g., several millimeters) a leading edge 412 of top plate 404. As the fluid dispenser moves over bottom plate 400 in a direction 408, top plate 404 and leading edge 412 also move over the bottom plate 400. Thus, an increasing area of bottom plate 400 is covered with the fluids and top plate 404 follows shortly thereafter. Because the fluids are deposited underneath top plate 404, the top plate is at least partially supported by the fluids, which are located between bottom plate 400 and top plate 404.

Figure 5:
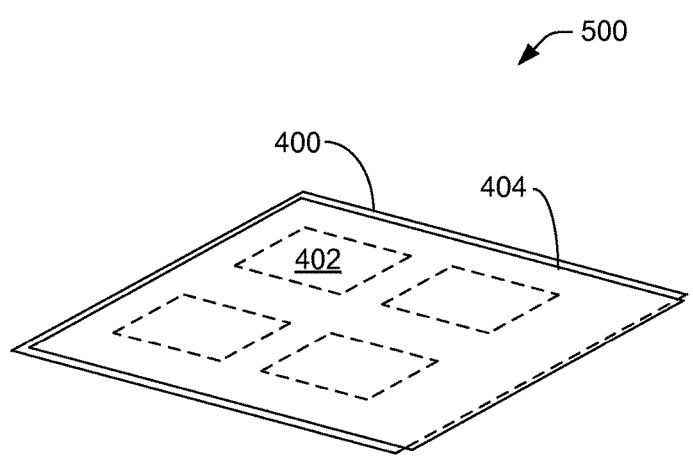

FIG. 5 illustrates a perspective view of structure 500 that includes bottom plate 400 and arrays of electrowetting elements 402 being covered by top plate 404 (with fluids located therebetween). Subsequent to the situation depicted in FIG. 5, the structure 500, including bottom plate 400, top plate 404 and a number of electrowetting elements therebetween, may be placed in a roller to squeeze out excess fluids and to laminate top plate 404 onto arrays of display elements 402. This lamination process also squeezes top plate 404 toward bottom plate 400 so that top plate 404 becomes supported by structure, such as edge seals and spacers (e.g., edge seals 118 and spacers 120 illustrated in FIG. 1) previously formed on bottom plate 400. Consequently, while the first fluid (e.g. first fluid 110) is substantially retained within individual electrowetting elements, the "second" fluid (e.g., third and fourth fluids 216 and 218) is retained in the array of electrowetting elements by the edge seals in cooperation with bottom plate 400 and top plate 402. Subsequent to the laminating process, individual arrays of electrowetting elements 402, and portions of top plate 404 laminated to them, can be partitioned by cutting structure 500 at or near peripheries of the arrays of electrowetting elements 402. As previously noted, once the structure 500 is closed by placing top plate 402 over bottom plate 400, e.g., top plate 116 is placed over bottom plate 104, the third and fourth fluids 216 and 218 described in FIG. 2 (e.g. the propylene glycol and dipropylene glycol layers) will mix to provide second fluid 114 on first fluid 110 within desired specifications.

Figure 6:
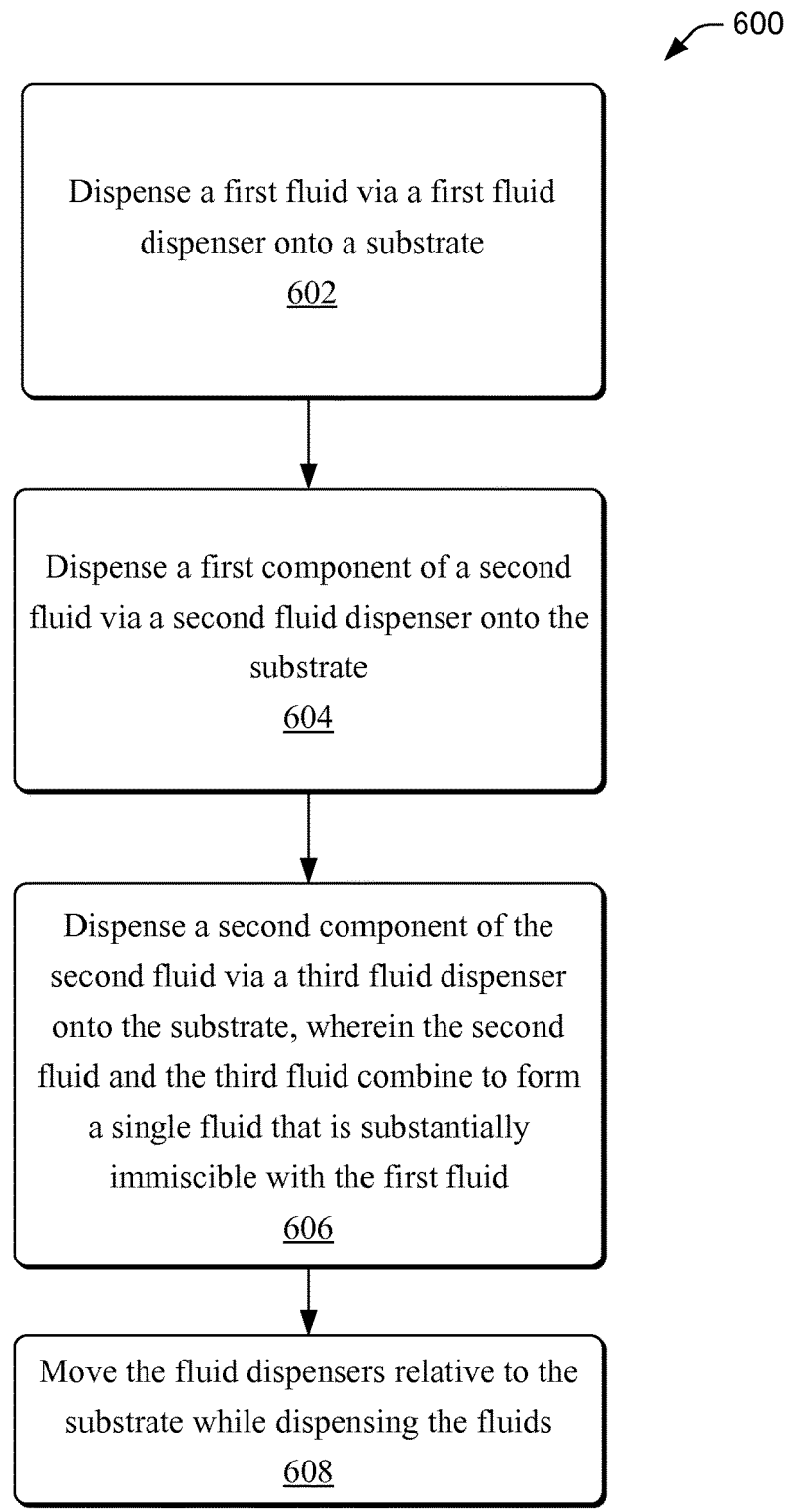
FIG. 6 is a flow diagram of a process for fabricating an electrowetting display device using a fluid dispenser, according to various example embodiments.

FIG. 6 is a flow diagram of a process for fabricating an electrowetting display device using one or more fluid dispensers to dispense fluids, according to various embodiments. For example, the electrowetting display device may be the same as or similar to the electrowetting display device illustrated in FIG. 1. Additionally, the fluid dispenser(s) may be similar to fluid dispenser 200, illustrated in FIG. 2. At block 602, a first fluid, e.g., first fluid 110, is dispensed via a first fluid dispenser onto a substrate. At block 604, a first component of a second fluid is dispensed via a second fluid dispenser onto the substrate. At block 606, a second component of the second fluid is dispensed via a third fluid dispenser onto the substrate, wherein the first component and the second component combine to form at least a portion of the second fluid, e.g. second fluid 114, that is substantially immiscible with the first fluid. At block 608, the fluid dispensers are moved relative to the substrate while dispensing the fluids.

While embodiments of the present disclosure have been described with respect to fabricating of electrowetting displays, those skilled in the art will understand that fluid dispensing for other applications may benefit from the apparatuses and techniques described herein. While embodiments of the present disclosure have been described with respect to use of ultimately two immiscible liquids, those skilled in the art will understand that the use of one or more than two liquids may benefit from the apparatuses and techniques described herein.

Figure 7:
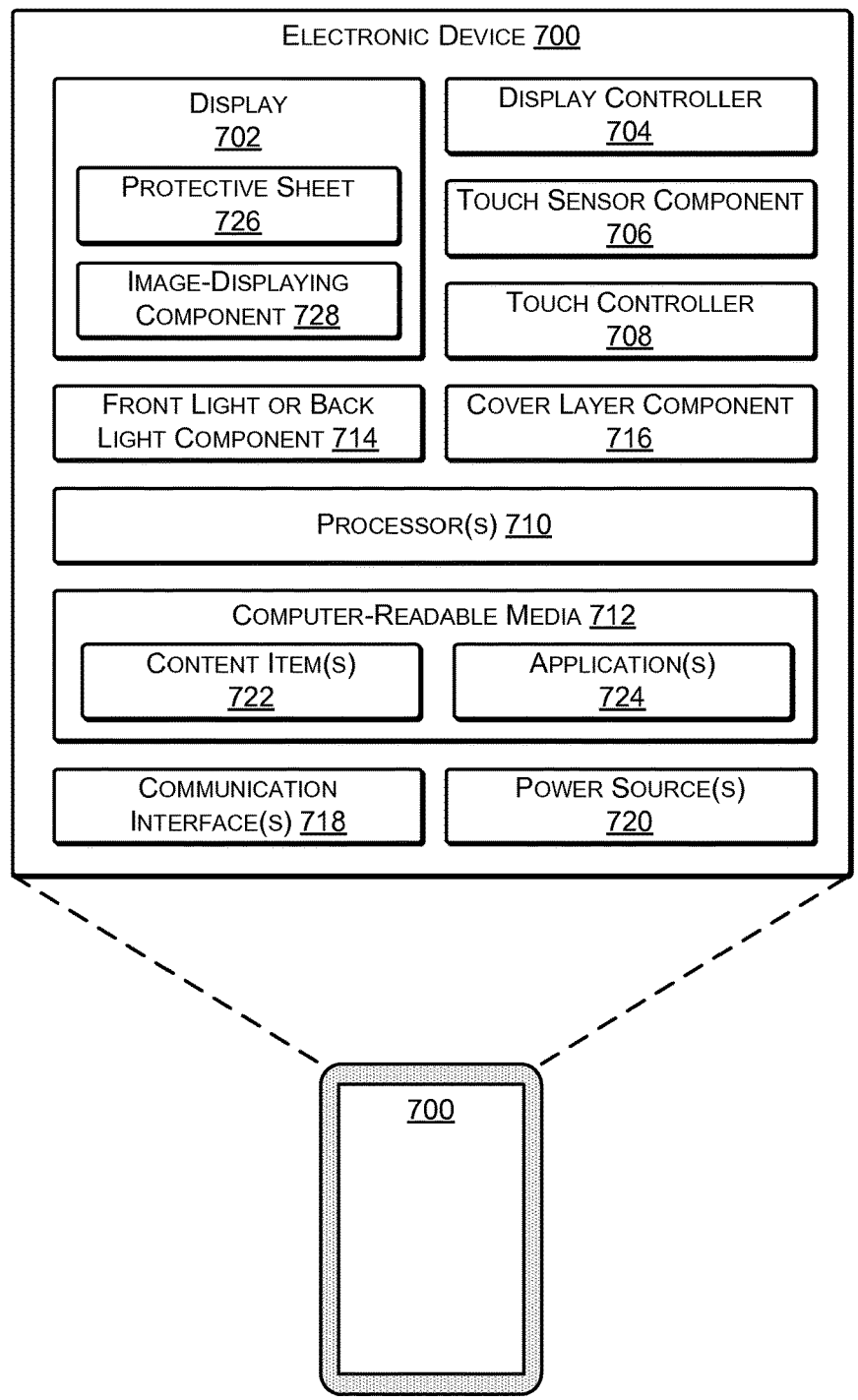
FIG. 7 illustrates an example electronic device that may incorporate a display device, according to some embodiments.

FIG. 7 illustrates an example electronic device 700 that may incorporate any of the display devices discussed above. The device 700 may comprise any type of electronic device having a display. For instance, the device 700 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 700 may be a non-mobile electronic device (e.g., a computer display, a television, etc.). In addition, while FIG. 7 illustrates several example components of the electronic device 700, it is to be appreciated that the device 700 may also include other conventional components, such as an operating system, system busses, input/output components, and the like. Further, in other examples, such as in the case of a television or computer monitor, the electronic device 700 may only include a subset of the components illustrated.

Regardless of the specific implementation of the electronic device 700, the device 700 includes a display 702 and a corresponding display controller 704. The display 702 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 702 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 700, the display 702 may be an active display such as a liquid crystal display, a plasma display, a light emitting diode display, an organic light emitting diode display, an electrowetting display and so forth. Accordingly, implementations herein are not limited to any particular display technology.

In an implementation, the display comprises an electrowetting display that employs an applied voltage to change the surface tension of a fluid in relation to a surface. For example, such an electrowetting display may include the array of pixels 100 illustrated in FIG. 1, though claimed subject matter is not limited in this respect. By applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 702 may represent a backlit display, examples of which are mentioned above.

In addition to including the display 702, FIG. 7 illustrates that some examples of the device 700 may include a touch sensor component 706 and a touch controller 708. In some instances, at least one touch sensor component 706 resides with, or is stacked on, the display 702 to form a touch-sensitive display (e.g., an electronic paper touch-sensitive display). Thus, the display 702 may be capable of both accepting user touch input and rendering content in response to or corresponding to the touch input. As several examples, the touch sensor component 706 may comprise a capacitive touch sensor, a force sensitive resistance (FSR), an interpolating force sensitive resistance (IFSR) sensor, or any other type of touch sensor. In some instances, the touch sensor component 706 is capable of detecting touches as well as determining an amount of pressure or force of these touches.

FIG. 7 further illustrates that the electronic device 700 may include one or more processors 710 and one or more computer-readable media 712, as well as a front light component 714 (which may alternatively be a backlight component in the case of a backlit display) for lighting the display 702, a cover layer component 716, such as a cover glass or cover sheet, one or more communication interfaces 718 and one or more power sources 720. The communication interfaces 718 may support both wired and wireless connection to various networks, such as cellular networks, radio, WiFi networks, short range networks (e.g., Bluetooth®), infrared (IR), and so forth.

Depending on the configuration of the electronic device 700, the computer-readable media 712 (and other computer-readable media described throughout) is an example of computer storage media and may include volatile and non-volatile memory. Thus, the computer-readable media 712 may include, but is not limited to, RAM, ROM, EEPROM, flash memory, or other memory technology, or any other medium that can be used to store computer-readable instructions, programs, applications, media items, and/or data which can be accessed by the electronic device 700.

The computer-readable media 712 may be used to store any number of functional components that are executable on the processor 710, as well as content items 722 and applications 724. Thus, the computer-readable media 712 may include an operating system and a storage database to store one or more content items 722, such as eBooks, audio books, songs, videos, still images, and the like. The computer-readable media 712 of the electronic device 700 may also store one or more content presentation applications to render content items on the device 700. These content presentation applications may be implemented as various applications 724 depending upon the content items 722. For instance, the content presentation application may be an electronic book reader application for rending textual electronic books, an audio player for playing audio books or songs, a video player for playing video, and so forth.

In some instances, the electronic device 700 may couple to a cover (not illustrated in FIG. 7) to protect the display (and other components in the display stack or display assembly) of the device 700. In one example, the cover may include a back flap that covers a back portion of the device 700 and a front flap that covers the display 702 and the other components in the stack. The device 700 and/or the cover may include a sensor (e.g., a Hall effect sensor) to detect when the cover is open (i.e., when the front flap is not atop the display and other components). The sensor may send a signal to the front light component 714 when the cover is open and, in response, the front light component 714 may illuminate the display 702. When the cover is closed, meanwhile, the front light component 714 may receive a signal indicating that the cover has closed and, in response, the front light component 714 may turn off.

Furthermore, the amount of light emitted by the front light component 714 may vary. For instance, upon a user opening the cover, the light from the front light may gradually increase to its full illumination. In some instances, the device 700 includes an ambient light sensor (not illustrated in FIG. 7) and the amount of illumination of the front light component 714 may be based at least in part on the amount of ambient light detected by the ambient light sensor. For example, the front light component 714 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 702 may vary depending on whether the front light component 714 is on or off, or based on the amount of light provided by the front light component 714. For instance, the electronic device 700 may implement a larger default font or a greater contrast when the light is off compared to when the light is on. In some instances, the electronic device 700 maintains, when the light is on, a contrast ratio for the display that is within a certain defined percentage of the contrast ratio when the light is off.

As described above, the touch sensor component 706 may comprise a capacitive touch sensor that resides atop the display 702. In some examples, the touch sensor component 706 may be formed on or integrated with the cover layer component 716. In other examples, the touch sensor component 706 may be a separate component in the stack of the display assembly. The front light component 714 may reside atop or below the touch sensor component 706. In some instances, either the touch sensor component 706 or the front light component 714 is coupled to a top surface of a protective sheet 726 of the display 702. As one example, the front light component 714 may include a lightguide sheet and a light source (not illustrated in FIG. 7). The lightguide sheet may comprise a substrate (e.g., a transparent thermoplastic such as PMMA or other acrylic), a layer of lacquer and multiple grating elements formed in the layer of lacquer that function to propagate light from the light source towards the display 702, thus illuminating the display 702.

The cover layer component 716 may include a transparent substrate or sheet having an outer layer that functions to reduce at least one of glare or reflection of ambient light incident on the electronic device 700. In some instances, the cover layer component 716 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 726 may include a similar UV-cured hard coating on the outer surface. The cover layer component 716 may couple to another component or to the protective sheet 726 of the display 702. The cover layer component 716 may, in some instances, also include a UV filter, a UV-absorbing dye, or the like, for protecting components lower in the stack from UV light incident on the electronic device 700. In still other examples, the cover layer component 716 may include a sheet of high-strength glass having an antiglare and/or antireflective coating.

The display 702 includes the protective sheet 726 overlying an image-displaying component 728. For example, the display 702 may be preassembled to have the protective sheet 726 as an outer surface on the upper or image-viewing side of the display 702. Accordingly, the protective sheet 726 may be integral with and may overlie the image-displaying component 728. The protective sheet 726 may be optically transparent to enable a user to view, through the protective sheet 726, an image presented on the image-displaying component 728 of the display 702.

In some examples, the protective sheet 726 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 726 may include a coating, such as the hard coating described above. For instance, the hard coating may be applied to the outer surface of the protective sheet 726 before or after assembly of the protective sheet 726 with the image-displaying component 728 of the display 702. In some examples, the hard coating may include a photoinitiator or other reactive species in its composition, such as for curing the hard coating on the protective sheet 726. Furthermore, in some examples, the protective sheet 726 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 726, thereby protecting the image-displaying component 728 from UV light.

According to some implementations herein, one or more of the components discussed above may be coupled to the display 702 using fluid optically-clear adhesive (LOCA). For example, suppose that the light guide portion of the front light component 714 is to be coupled to the display 702. The light guide may be coupled to the display 702 by placing the LOCA on the outer or upper surface of the protective sheet 726. When the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 714 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 714. In other implementations, the LOCA may be placed near a center of the protective sheet 726, and pressed outwards towards a perimeter of the top surface of the protective sheet 726 by placing the front light component 714 on top of the LOCA. The LOCA may then be cured by directing UV light through the front light component 714. As discussed above, and as discussed additionally below, various techniques, such as surface treatment of the protective sheet, may be used to prevent discoloration of the LOCA and/or the protective sheet 726.

While FIG. 7 illustrates a few example components, the electronic device 700 may have additional features or functionality. For example, the device 700 may also include additional data storage devices (removable and/or non-removable) such as, for example, magnetic disks, optical disks, or tape. The additional data storage media, which may reside in a control board (not illustrated), may include volatile and nonvolatile, removable and non-removable media implemented in any method or technology for storage of information, such as computer readable instructions, data structures, program modules, or other data. In addition, some or all of the functionality described as residing within the device 700 may reside remotely from the device 700 in some implementations. In these implementations, the device 700 may utilize the communication interfaces 718 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An apparatus for fabricating one or more electrowetting display devices, wherein the one or more electrowetting display devices each comprise an array of electrowetting elements separated by electrowetting element walls, the apparatus comprising:
    a platform to hold a substrate to receive an electrowetting oil and an electrolyte solution; and
    a fluid dispenser to dispense the electrowetting oil and the electrolyte solution onto the substrate, wherein the fluid dispenser comprises:
    a first nozzle to dispense the electrowetting oil onto the substrate, wherein the first nozzle includes a first channel and a first opening, for the electrowetting oil to travel through the first channel and exit the first nozzle through the first opening;
    a second nozzle to dispense water to remove electrowetting oil from top surfaces of electrowetting element walls, wherein the second nozzle includes a second channel and a second opening, for the water to travel through the second channel and exit the second nozzle through the second opening;
    a third nozzle to dispense a first component of the electrolyte solution, wherein the third nozzle includes a third channel and a third opening, for the first component to travel through the third channel and exit the third nozzle through the third opening; and
    a fourth nozzle adjacent to the third nozzle to dispense a second component of the electrolyte solution, wherein the fourth nozzle includes a fourth channel and a fourth opening, for the second component to travel through the fourth channel and exit the fourth nozzle through the fourth opening;
    wherein the fluid dispenser is movable relative to the platform while the fluid dispenser dispenses the electrowetting oil and the first and second components of the electrolyte solution, and
    wherein dispensing of the first component pushes substantially all of the water out of the one or more electrowetting display devices.

2. The apparatus of claim 1, wherein the electrolyte solution comprises propylene glycol and dipropylene glycol, wherein the third nozzle dispenses the dipropylene glycol and the fourth nozzle dispenses the propylene glycol, and wherein dispensing of the dipropylene glycol pushes substantially all of the water out of the one or more electrowetting display devices due to viscosity of the dipropylene glycol relative to viscosity of water.

3. An apparatus for fabricating one or more electrowetting display devices, the apparatus comprising a fluid dispenser to dispense fluids onto a substrate, wherein the fluid dispenser comprises:
    a first channel defined with the fluid dispenser to dispense a first fluid of the fluids through a first opening onto the substrate;

a second channel defined with the fluid dispenser to dispense a first component of a second fluid of the fluids through a second opening; and a third channel defined with the fluid dispenser to dispense a second component of the second fluid through a third opening such that the second component combines with the first component to form at least a portion of the second fluid that is substantially immiscible with the first fluid.

4. The apparatus of claim 3, further comprising a fourth channel defined with the fluid dispenser located between the first and second channels to dispense water through a fourth opening, wherein the water is dispensable to remove the first fluid from top surfaces of electrowetting element walls in the one or more electrowetting display devices.

5. The apparatus of claim 4, wherein the first fluid comprises oil.

6. The apparatus of claim 3, wherein the second fluid comprises an electrolyte solution.

7. The apparatus of claim 6, wherein the electrolyte solution comprises propylene glycol and dipropylene glycol, wherein the second channel dispenses the dipropylene glycol and the third channel dispenses the propylene glycol.

8. The apparatus of claim 7, further comprising a fourth channel defined with the fluid dispenser and located between the first and second channels, to dispense water through a fourth opening to remove the first fluid from top surfaces of electrowetting element walls in the one or more electrowetting display devices.

9. The apparatus of claim 8, wherein the first fluid comprises oil.

10. The apparatus of claim 3, further comprising a platform to support the substrate, wherein at least one of the fluid dispenser or the platform is configured to move relative to the other while the fluid dispenser dispenses the fluids.

11. The apparatus of claim 10, wherein the platform is movable relative to the fluid dispenser.

12. The apparatus of claim 10, wherein the fluid dispenser is movable relative to the substrate.

13. The apparatus of claim 10, wherein the platform and the fluid dispenser are both movable relative to one another.

* * * * *